(12) United States Patent
Simpson et al.

(10) Patent No.: US 9,820,445 B2
(45) Date of Patent: Nov. 21, 2017

(54) RECIPROCATING CUTTING TOOL

(75) Inventors: Peter Simpson, Lower Cambourne (GB); Rainer Glauning, Aichtal-Groetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 1145 days.

(21) Appl. No.: 12/042,438

(22) Filed: Mar. 5, 2008

(65) Prior Publication Data
US 2009/0188361 A1    Jul. 30, 2009

(30) Foreign Application Priority Data
Mar. 14, 2007 (EP) .................................... 07104129

(51) Int. Cl.
| | |
|---|---|
| A01G 3/053 | (2006.01) |
| A01D 34/135 | (2006.01) |
| A01D 34/37 | (2006.01) |
| A01D 34/30 | (2006.01) |
| A01D 34/408 | (2006.01) |
| A01G 3/04 | (2006.01) |

(52) U.S. Cl.
CPC ........... *A01G 3/053* (2013.01); *A01D 34/135* (2013.01); *A01D 34/30* (2013.01); *A01D 34/37* (2013.01); *A01D 34/408* (2013.01); *A01G 2003/0461* (2013.01); *Y10T 83/525* (2015.04); *Y10T 83/536* (2015.04)

(58) Field of Classification Search
CPC ...... A01D 34/13; A01D 34/135; A01D 34/30; A01D 34/37; A01D 34/404; A01D 34/408; A01G 3/053; A01G 2003/0461; Y10T 83/525

USPC ........ 30/208–210; 83/360; 56/246, 257, 264
See application file for complete search history.

(56) References Cited

U.S. PATENT DOCUMENTS

| | | | | |
|---|---|---|---|---|
| 3,347,029 | A | * | 10/1967 | Grinwald .............................. 56/9 |
| 3,408,875 | A | | 11/1968 | Briskman et al. ................. 74/48 |
| 4,609,155 | A | * | 9/1986 | Garnier ........................... 241/30 |
| 4,638,562 | A | * | 1/1987 | Drake ........................... 30/296.1 |
| 5,150,523 | A | * | 9/1992 | McCurry ......................... 30/228 |
| 6,886,317 | B2 | * | 5/2005 | Jackson et al. .................. 56/298 |
| 7,543,434 | B2 | * | 6/2009 | Jackson et al. .................. 56/298 |

(Continued)

FOREIGN PATENT DOCUMENTS

| | | |
|---|---|---|
| DE | 33 43 772 | 6/1985 |
| FR | 2 628 935 | 9/1989 |
| JP | 2005-269972 | 10/2005 |

*Primary Examiner* — Clark F Dexter
(74) *Attorney, Agent, or Firm* — Maginot, Moore & Beck LLP (57) ABSTRACT

The present invention relates to cutting tools, in particular, to control systems for cutters such as vegetation cutters, especially hedge cutters or trimmers (10). Hedge cutters (10) frequently suffer in use from a problem of blocked cutting blades when they encounter a twig or branch whose size or density exceeds the capacity of the blades. We describe a vegetation cutting apparatus (10) having a plurality of cutting blades (11,12), at least one of which blades (11,12) is drivable by an electric motor. At least one driven blade (11,12) is movable between two predefined points of maximum travel. The apparatus (10) includes a control mechanism which causes a change of direction in the movement of the at least one movable blade at a point intermediate the points of maximum travel in response to an event sensed by the control mechanism.

17 Claims, 5 Drawing Sheets

(56) References Cited

U.S. PATENT DOCUMENTS

2004/0144075 A1\* 7/2004 Jackson et al. ................ 56/257
2005/0188666 A1\* 9/2005 Jackson et al. ................ 56/246

\* cited by examiner

RECIPROCATING CUTTING TOOL

CROSS-REFERENCE

The invention described and claimed hereinbelow is also described in EP 07104239, filed on Mar. 14, 2007. This European Patent Application, whose subject matter is incorporated here by reference, provides the basis for a claim of priority of invention under 35 U.S.C. 119 (a)-(d).

BACKGROUND OF THE INVENTION

The present invention relates to cutting tools. In particular, it relates to control systems for vegetation cutters especially hedge cutters or trimmers.

Hedgecutters comprise two elongate blades which reciprocate with respect to each other. Either one blade is fixed and the other caused to reciprocate or both blades caused to reciprocate in an equal and opposite manner. The blades are driven by means of a cam element driven by the output shaft of an electric motor or small engine. One such cutter is described in JP2005269972, which hedge cutter also includes a switch allowing the user to reverse the direction of motion of one of the blades.

Hedgecutters frequently suffer in use from a problem of blocked cutting blades when they encounter a twig or branch whose size or density exceeds the capacity of the blades. The operator typically removes the power to the blades to remove the pressure of the moving blade on the branch and then attempts to remove the branch by pulling the branch. This can give rise to substantial safety considerations as the user places their fingers near to the blades. Similar problems are presented with other cutting tools. The present invention seeks to overcome this problem and assist in freeing blocked cutter blades.

SUMMARY OF THE INVENTION

The present invention provides a cutting tool having at least one driven blade movable between two predefined points of maximum travel, the tool further comprising a prime mover adapted to cause movement of the said at least one movable blade between said points of maximum travel; characterized in that the cutting tool is further provided with a control means which causes a change of direction in the movement of the at least one movable blade at a point intermediate the points of maximum travel in response to an event sensed by the control means.

Preferably, the prime mover is an electric motor. More preferably, the change of direction is achieved by a change in the direction of motor rotation.

Preferably, the control means comprises a control circuit.

In one embodiment, the event is an increase in cutting load. Suitably the control circuit includes a current sensing circuit such that, when the current drawn by the motor exceeds a predetermined level, the control circuit reverses the direction of rotation of the motor. Alternatively, the control circuit includes a speed sensor, adapted to sense when the speed of the driven blade falls below a predetermined level.

In an alternative embodiment, the event is removal of power to the driven blade. Suitably, the control circuit is adapted to cause rotation of the motor sequentially in a first direction upon a first application of electrical power to the motor and in a second direction upon a subsequent application of electrical power to the motor.

In one embodiment the control circuit is adapted to operate the motor in the reverse direction for a predetermined period whereupon the circuit then causes operation of the motor in the normal direction. Suitably, the predetermined period is less than 1 second, more suitably less than half a second, even more suitably from 200 ms to 400 ms.

Preferably, the cutting tool is a portable tool. More preferably, the cutting tool is a vegetation cutter, most preferably a hedge cutter or hedge trimmer.

Preferably the cutting tool includes a gearbox intermediate the motor and the at least one drivable blade. More preferably, the gearbox includes a low ratio reverse gear.

Preferably, the cutting tool comprises an electric motor powered by means of a rechargeable battery or cell More preferably, the battery is a lithium ion battery.

BRIEF DESCRIPTION OF THE DRAWINGS

The above and other aspects of the present invention will now be described in further detail, by way of example only with reference to the accompanying figures in which.

DETAILED DESCRIPTION OF THE PREFERRED EMBODIMENTS

Figure 1:
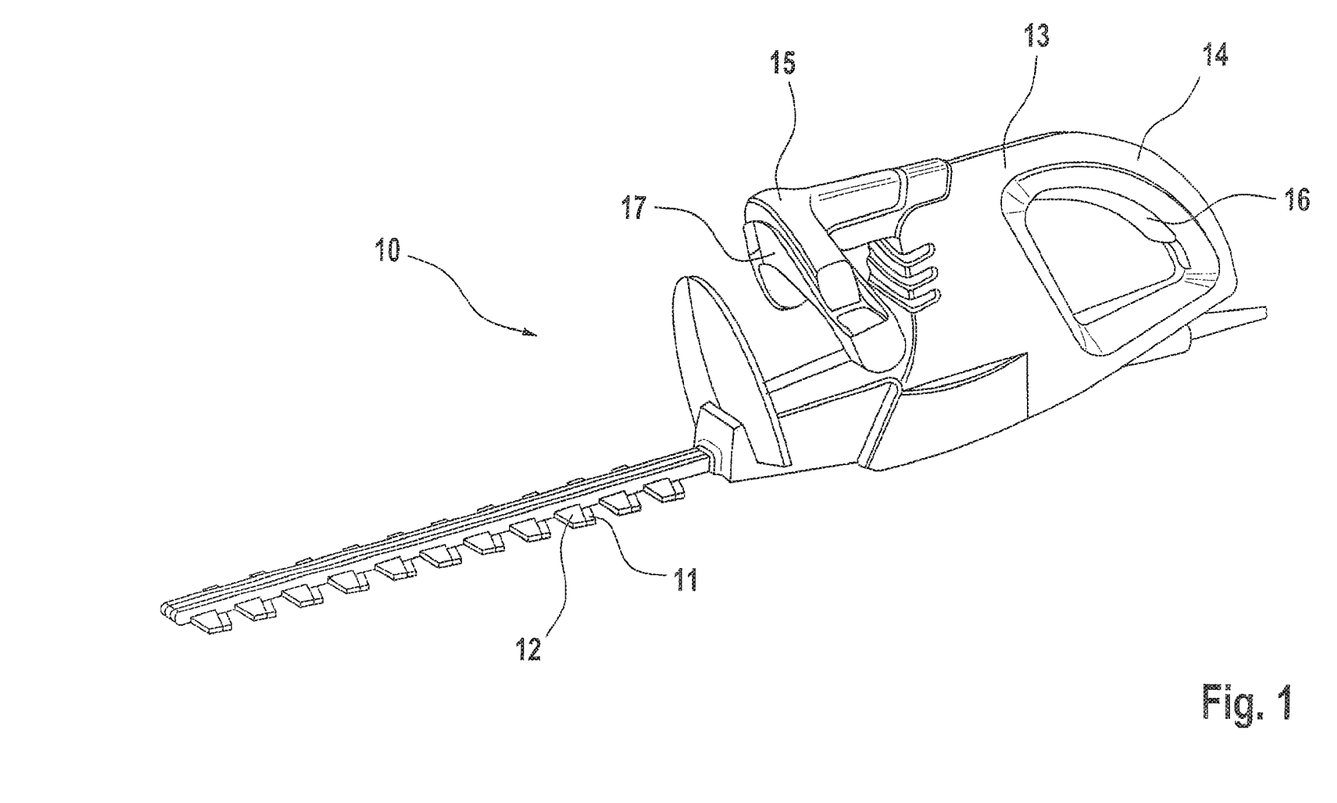
FIG. 1 is a perspective view of the invention showing the exterior features of a typical prior art hedgecutter.

A typical vegetation cutter in accordance with the present invention is in the form of an electric hedgecutter 10 having a bottom blade 11 and an upper blade 12 caused to reciprocate simultaneously and in an equal and opposite manner with respect to the housing and hence also to each other by means of an electric motor M housed in a housing unit 13. The housing unit 13 includes two grips 14, 15, each associated with a switch arrangement 16, 17. This switching configuration provides a safety feature requiring both left and right hands of the operator to be in position and actuating their respective switches in order to supply an electric current to the motor. Accordingly, the blades cannot be put into an operating configuration unless both hands are away from the blades.

The motor acts to reciprocate the moving blades 11,12 in a conventional manner through suitable gearing as required.

In accordance with the present invention, it is possible to drive the reciprocating blade 11 in a reverse direction, compared with its normal cutting direction. It will be appreciated that, in the context of a reciprocating action, the term 'reverse' is used in a relative sense rather than an absolute sense. In use, a hedgecutter frequently suffers from jamming when it encounters a branch or twig whose diameter or density exceeds the capacity of the blades. The present invention overcomes this jamming in one of two ways.

In one arrangement, the reciprocating blade is caused to reverse direction for a brief period, sufficient to release the jammed branch, before resuming its conventional direction automatically, without the operator releasing the switches.

Figure 2:
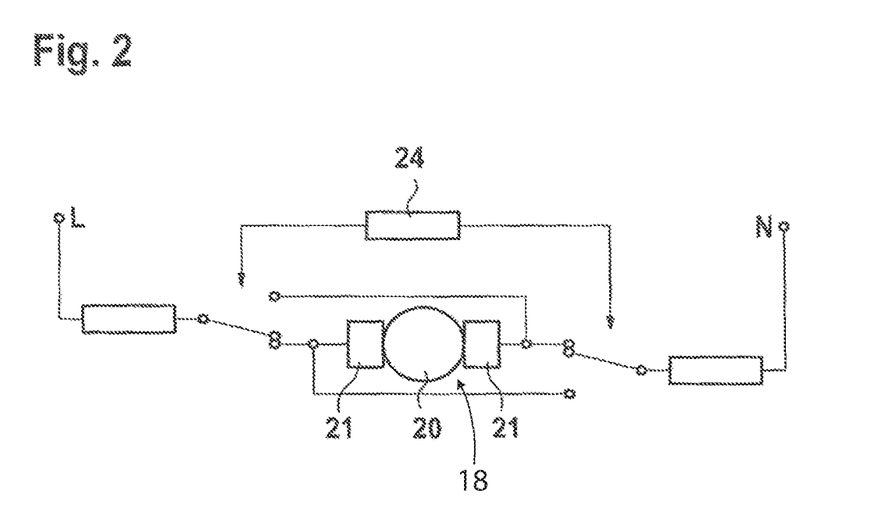
FIG. 2 shows, schematically, control circuit CC that is a control circuit for a vegetation cutter in accordance with the present invention powered by an AC motor.

In preferred arrangements, the reciprocating blade is caused to reverse its direction and maintain the reversed direction until such time as a further jammed situation is detected, whereupon the direction is reversed again, to the original direction, and so on automatically, without the operator releasing the switches. With this arrangement, upon encountering a jammed or stalled situation, the blade is caused to oscillate back and forth, thereby cutting the branch from both sides and achieving a cut which would not otherwise have been possible with the hedgecutter. Accordingly, the present invention not only provides a solution to the problem of stalled blades due to jamming but also extends the cutting capability of the cutting tool Referring to FIG. 2, there is shown schematically a control circuit CC enabling this to be achieved in the context of an AC motor 18 (see FIG. 2) having zero commutator/brush shift. The drive motor has an armature 20 and brushes 21. Reverse rotation is achieved by reversing the direction of current through armature 20 by means of a double pole changeover relay 24. In an alternative embodiment, a 4-triac bridge is used.

Relay changeover state can be changed by means of further electronic control circuitry, the precise configuration of which would be readily apparent to the person skilled in the art.

In the case of motor M that is an AC motor 18 (see FIG. 2) having commutator/brush shift in addition to the electrical switchover, the brushes are mechanically moved, suitably by means of an electromechanical switching arrangement, thereby replicating the commuter/brush shift for the alternative direction of running.

In the case of motor M that is a DC motor 19 (see FIG. 3) powered vegetation cutter, suitably zero brush shift is incorporated. Reverse action of the motor, and thus reciprocating blade 12, is achieved by reversal of the motor polarity achievable with solid state or electromechanical switching.

Figure 3:
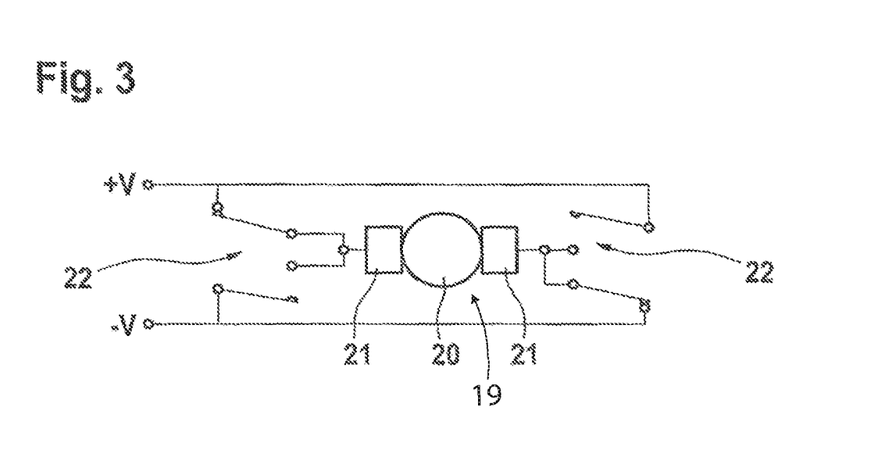
FIG. 3 shows, schematically, control circuit CC that is a control circuit for a brushed DC motor-powered vegetation cutter in accordance with the present invention.

In a preferred embodiment, the vegetation cutter is battery-powered, more preferably by means of a Li-ion battery unit. Devices using Li-ion batteries typically include an over-current protection circuit. This can be adapted to include the control circuit for the reverse drive operation of the present invention. FIG. 3 shows a suitable schematic control circuit CC showing that the change of motor direction can be readily accomplished by means of a MOSFET bridge 22. If a brushless DC motor is utilized, the commutation electronics can advantageously be programmed to reverse the motor direction.

The blade reversal event is advantageously triggered by detection of an increase in or high values of cutting load. In preferred embodiments, the control circuit includes a current sensing circuit for this purpose, adapted to initiate motor reverse when the current drawn by the motor exceeds a predetermined level. Typically, this would be the value at stall, although a value less than stall can be used such that the motor is not permitted to reach a stall condition. Accordingly, the battery charge is prolonged as it is not permitted to supply a full stall current, acting as further protection, in addition to the normal protection, to prevent abuse from overcurrent.

Alternatively, blade reversal can be triggered on each occasion electrical power is applied to the motor. When the motor is re-energized in a stall situation, the reciprocating blade(s) therefore reverses to clear the stall.

The vegetation cutter may include gearing adapted to allow a lower ratio geared reverse from that of the forward direction. This acts to aid unblocking of the blades and is particularly suitable for embodiments in which the reversal of blade movement is only temporary.

Figure 4:
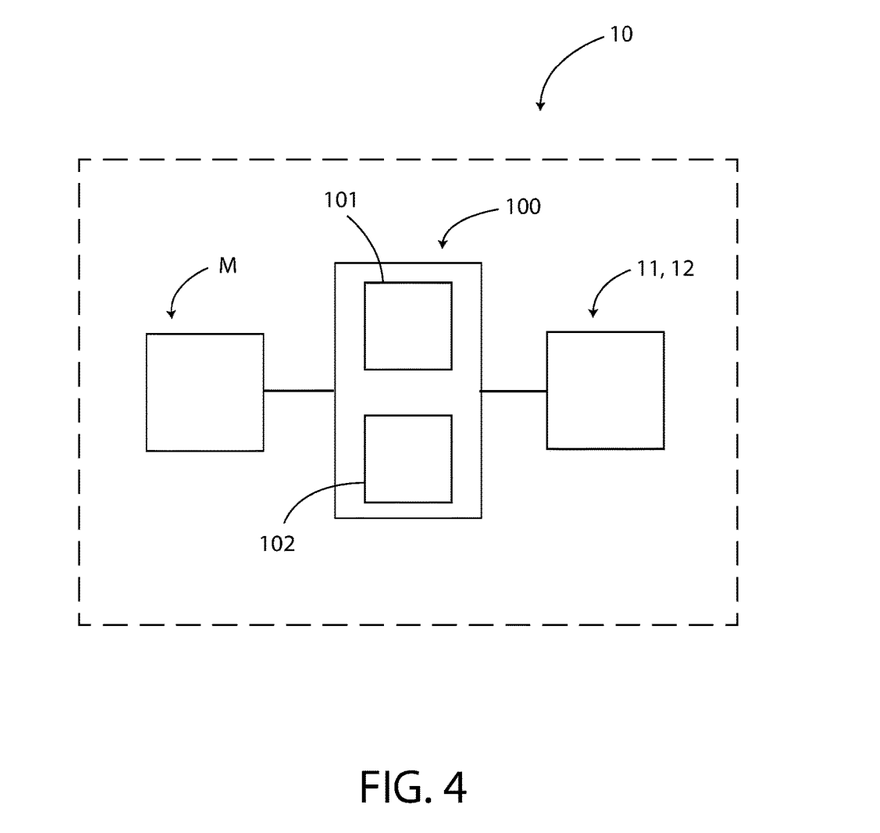
FIG. 4 shows, schematically, components of the hedge cutter including the gearbox.
Figure 5:
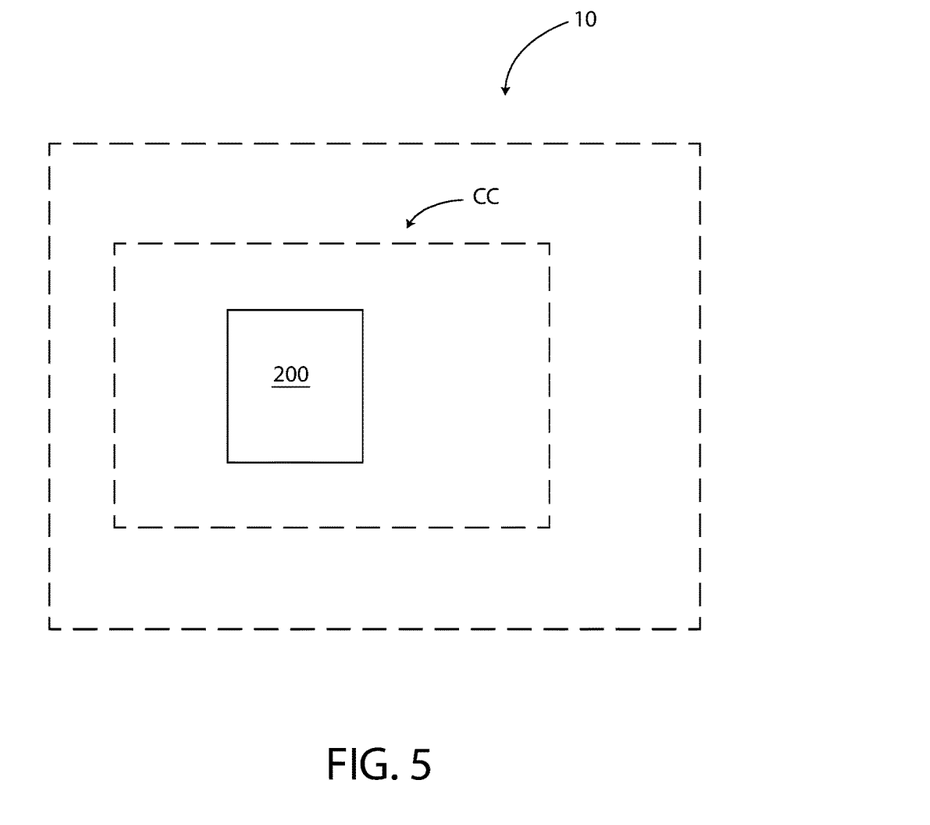
FIG. 5 shows, schematically, components of the hedge cutter including the speed sensor.
Figure 6:
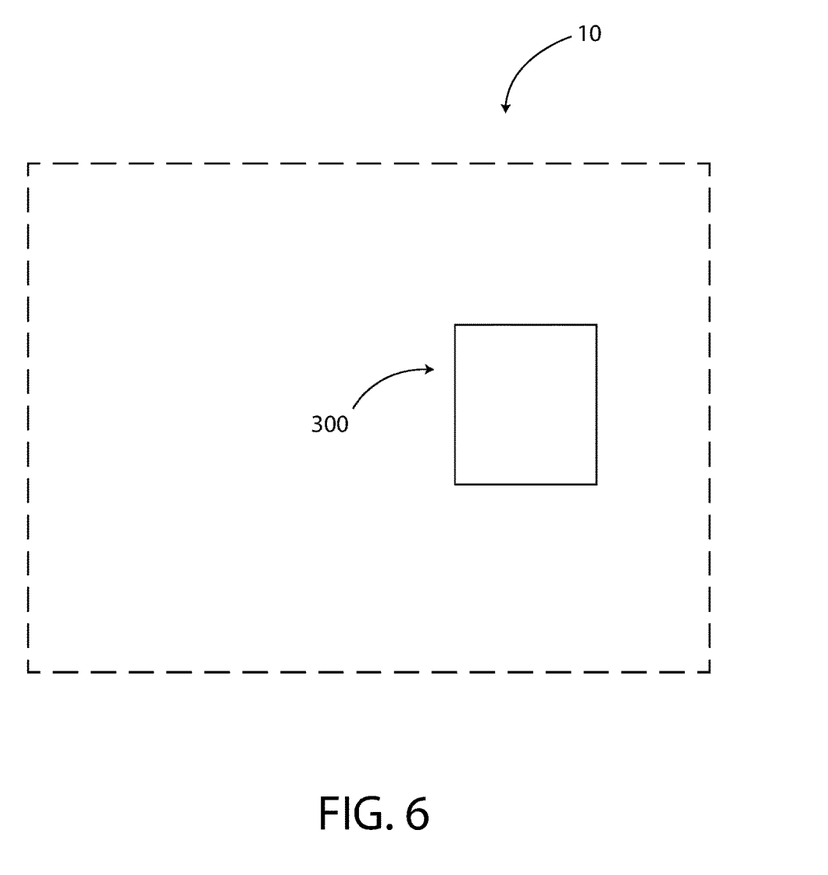
FIG. 6 shows, schematically, a component of the hedge cutter including the rechargeable battery.

As mentioned above, the electric hedgecutter 10 includes a gearbox 100 positioned intermediate the electric motor M and at least one of the blades 11,12 as schematically shown in FIG. 4. The gearbox 100 includes a forward gear 101 and a reverse gear 102. The reverse gear 102 has a lower ratio than the forward gear 101. Further as mentioned above and as schematically shown in FIG. 5, the control circuit CC includes a speed sensor 200. Also as mentioned above and as schematically shown in FIG. 6, the electric hedgecutter 10 includes the rechargeable battery 300.

The present invention provides two solutions to the same technical problem of blade jamming in hedgecutters and other vegetation cutting apparatus. In one arrangement, when a jammed or stalled situation is sensed, the powered cutter blade is automatically put into reverse to free the vegetation causing the stall In the second arrangement it is recognized that the user will typically recognize a jammed or stalled situation and will instinctively release some or both switches and so cut power to the motor. This leaves the cutter in the jammed configuration. Accordingly, the blade is put into a reverse direction automatically on re-application of power to the motor. Those skilled in the art will be readily able to design suitable circuits to include the above features together with such other features as they require for a particular vegetation cutting apparatus.

The invention claimed is:

1. A hand-held hedge cutter, comprising:
a housing;
a blade arrangement including at least a first blade and a second blade;
an electric motor configured to be in an on-state of operation and an off-state of operation,
wherein when the electric motor is in the on-state of operation, the electric motor is configured to operate in (i) a first mode of operation in which the electric motor operates with a first direction of motor rotation, and (ii) a second mode of operation in which the electric motor operates with a second direction of motor rotation,
wherein (i) when the electric motor is operating in the first mode of operation, the first blade reciprocates in relation to the housing between a first pre-defined point of maximum travel and a second pre-defined point of maximum travel, and (ii) when the electric motor is operating in the second mode of operation, the first blade further reciprocates in relation to the housing between the first pre-defined point of maximum travel and the second pre-defined point of maximum travel;
a handle having at least one handle portion provided with a switch arrangement, the switch arrangement being configured to switch the electric motor between the on-state of operation and the off-state of operation;
a control circuit configured to (i) sense an initial event, and switch operation of the electric motor from the first mode of operation to the second mode of operation in response thereto, and (ii) sense a first subsequent event, and switch operation of the electric motor from the second mode of operation to the first mode of operation in response thereto;
wherein the first blade moves in (i) a forward direction in relation to the housing during travel from the first pre-defined point of maximum travel to the second pre-defined point of maximum travel, and (ii) a reverse direction in relation to the housing during travel from the second pre-defined point of maximum travel to the first pre-defined point of maximum travel, and wherein, when the control circuit switches operation of the electric motor from the first mode of operation to the second mode of operation in response to sensing the initial event while the first blade is located intermediate the first pre-defined point of maximum travel and the second pre-defined point of maximum travel, (i) the first blade is caused to switch movement between the forward direction and the reverse direction, and thereafter (ii) the electric motor is caused to continue operating in the second mode of operation until the control circuit senses the first subsequent event, wherein the initial event or the first subsequent event sensed by the control circuit is an increase in cutting load on the blade arrangement.

2. The hand-held hedge cutter of claim 1, further comprising a gearbox positioned intermediate the electric motor and the first blade, wherein the gearbox includes a forward gear and a reverse gear, and wherein the reverse gear has a lower ratio than the forward gear.

3. The hand-held hedge cutter of claim 1, wherein:
the control circuit is configured to sense the initial event and the first subsequent event in response to a branch being positioned in a cutting space defined between adjacent cutting teeth of the first blade, and
in response to the control circuit sensing the initial event and the first subsequent event, the first blade will be caused to oscillate back and forth so as to cut the branch on both sides thereof.

4. The hand-held hedge cutter of claim 1, wherein:
the control circuit includes a current sensing circuit,
the electric motor draws a level of current when the electric motor is in the on-state of operation, and
the initial event or the first subsequent event sensed by the control circuit is the level of current drawn by the electric motor exceeding a predetermined level.

5. The hand-held hedge cutter of claim 1, further comprising a rechargeable battery.

6. The hand-held hedge cutter of claim 5, wherein the rechargeable battery is a lithium ion battery.

7. The hand-held hedge cutter of claim 1, wherein:
the control circuit is further configured to sense a second subsequent event that occurs after the first subsequent event, and switch operation of the electric motor from the first mode of operation to the second mode of operation in response thereto,
when the control circuit switches operation of the electric motor from the second mode of operation to the first mode of operation in response to sensing the first subsequent event while the first blade is located intermediate the first pre-defined point of maximum travel and the second pre-defined point of maximum travel, (i) the first blade is caused to switch movement between the forward direction and the reverse direction, and thereafter (ii) the electric motor is caused to continue operating in the first mode of operation until the control circuit senses the second subsequent event.

8. The hand-held hedge cutter of claim 1, wherein:
when the first blade is traveling in a forward direction in relation to the housing during travel from the first pre-defined point of maximum travel to the second pre-defined point of maximum travel, the switch of movement between the forward direction and the reverse direction includes switching movement from the forward direction to the reverse direction, and when the first blade is traveling in a reverse direction in relation to the housing during travel from the second pre-defined point of maximum travel to the first pre-defined point of maximum travel, the switch of movement between the forward direction and the reverse direction includes switching movement from the reverse direction to the forward direction.

9. The hand-held hedge cutter of claim 1, wherein:
the blade arrangement extends in a direction from the housing in a cantilevered manner, and
the first blade is configured to reciprocate along the direction of extent between the first pre-defined point of maximum travel and the second pre-defined point of maximum travel.

10. A hand-held hedge cutter, comprising:
a housing;
a blade arrangement including at least a first blade and a second blade;
an electric motor configured to be in an on-state of operation and an off-state of operation,
wherein when the electric motor is in the on-state of operation, the electric motor is configured to operate in (i) a first mode of operation in which the electric motor operates with a first direction of motor rotation, and (ii) a second mode of operation in which the electric motor operates with a second direction of motor rotation,
wherein (i) when the electric motor is operating in the first mode of operation, the first blade reciprocates in relation to the housing between a first pre-defined point of maximum travel and a second pre-defined point of maximum travel, and (ii) when the electric motor is operating in the second mode of operation, the first blade further reciprocates in relation to the housing between the first pre-defined point of maximum travel and the second pre-defined point of maximum travel;
a handle having at least one handle portion provided with a switch arrangement, the switch arrangement being configured to switch the electric motor between the on-state of operation and the off-state of operation;
a control circuit configured to (i) sense an initial event, and switch operation of the electric motor from the first mode of operation to the second mode of operation in response thereto, and (ii) sense a first subsequent event, and switch operation of the electric motor from the second mode of operation to the first mode of operation in response thereto;
wherein the first blade moves in (i) a forward direction in relation to the housing during travel from the first pre-defined point of maximum travel to the second pre-defined point of maximum travel, and (ii) a reverse direction in relation to the housing during travel from the second pre-defined point of maximum travel to the first pre-defined point of maximum travel, and
wherein, when the control circuit switches operation of the electric motor from the first mode of operation to the second mode of operation in response to sensing the initial event while the first blade is located intermediate the first pre-defined point of maximum travel and the second pre-defined point of maximum travel, (i) the first blade is caused to switch movement between the forward direction and the reverse direction, and thereafter (ii) the electric motor is caused to continue operating in the second mode of operation until the control circuit senses the first subsequent event, wherein the control circuit includes a speed sensor, wherein the first blade is configured to reciprocate at a speed between the first pre-defined point of maximum travel and the second pre-defined point of maximum travel, and wherein the initial event or the first subsequent event sensed by the control circuit is the speed falling being below a predetermined level.

11. The hand-held hedge cutter of claim 10, wherein:

the control circuit is configured to sense the initial event and the first subsequent event in response to a branch being positioned in a cutting space defined between adjacent cutting teeth of the first blade, and in response to the control circuit sensing the initial event and the first subsequent event, the first blade will be caused to oscillate back and forth so as to cut the branch on both sides thereof.

12. The hand-held hedge cutter of claim 10, further comprising a rechargeable battery.

13. The hand-held hedge cutter of claim 12, wherein the rechargeable battery is a lithium ion battery.

14. The hand-held hedge cutter of claim 10, wherein:

the control circuit is further configured to sense a second subsequent event that occurs after the first subsequent event, and switch operation of the electric motor from the first mode of operation to the second mode of operation in response thereto, when the control circuit switches operation of the electric motor from the second mode of operation to the first mode of operation in response to sensing the first subsequent event while the first blade is located intermediate the first pre-defined point of maximum travel and the second pre-defined point of maximum travel, (i) the first blade is caused to switch movement between the forward direction and the reverse direction, and thereafter (ii) the electric motor is caused to continue operating in the first mode of operation until the control circuit senses the second subsequent event.

15. The hand-held hedge cutter of claim 10, wherein:

when the first blade is traveling in a forward direction in relation to the housing during travel from the first pre-defined point of maximum travel to the second pre-defined point of maximum travel, the switch of movement between the forward direction and the reverse direction includes switching movement from the forward direction to the reverse direction, and when the first blade is traveling in a reverse direction in relation to the housing during travel from the second pre-defined point of maximum travel to the first pre-defined point of maximum travel, the switch of movement between the forward direction and the reverse direction includes switching movement from the reverse direction to the forward direction.

16. The hand-held hedge cutter of claim 10, wherein:

the blade arrangement extends in a direction from the housing in a cantilevered manner, and the first blade is configured to reciprocate along the direction of extent between the first pre-defined point of maximum travel and the second pre-defined point of maximum travel.

17. The hand-held hedge cutter of claim 10, further comprising a gearbox positioned intermediate the electric motor and the first blade, wherein the gearbox includes a forward gear and a reverse gear, and wherein the reverse gear has a lower ratio than the forward gear.

* * * * *